Feb. 21, 1950 G. J. REILLY ET AL 2,497,911
HYDROGEN THYRATRON
Filed Aug. 3, 1945 5 Sheets-Sheet 1

INVENTOR.
WILLIS E. HARBAUGH
GERARD J. REILLY
BY
William D. Hall
ATTORNEY

Feb. 21, 1950     G. J. REILLY ET AL     2,497,911
HYDROGEN THYRATRON Filed Aug. 3, 1945     5 Sheets-Sheet 2

INVENTOR.
WILLIS E. HARBAUGH
BY    GERARD J. REILLY

ATTORNEY

*INVENTOR.*
WILLIS E. HARBAUGH
GERARD J. REILLY
BY
William D. Hall
ATTORNEY

EXPERIMENTAL HYDROGEN PRESSURE-TEMPERTURE CURVE
FOR ZIRCONIUM HYDRIDE

FIG. 14.

EXPERIMENTAL HYDROGEN PRESSURE-TEMPERATURE CURVE
FOR TITANIUM HYDRIDE

FIG. 15.

INVENTOR.
WILLIS E. HARBAUGH
GERARD J. REILLY
BY
ATTORNEY

UNITED STATES PATENT OFFICE 2,497,911

HYDROGEN THYRATRON

Gerard J. Reilly, Rumson, and Willis E. Harbaugh, Fair Haven, N. J.

Application August 3, 1945, Serial No. 608,827

9 Claims. (Cl. 250—27.5)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to gas-filled thermionic tubes and more particularly to their methods of manufacture and to certain structural improvements which embrace the characteristics and life of these gas-filled tubes of the type which use hydrogen as the ionizable conducting medium. A divisional application, Serial No. 117,484, has been filed September 8, 1949, under the same names and title.

In the prior art it has been a well established practice to use mercury vapor as an ionizable medium within the gas-filled tubes because of the low voltage drop obtainable with the mercury arc, this low voltage drop contributing to high efficiency of the tubes, and because of the ease of maintaining constant the required pressure within the tube. The latter requirement is usually satisfied by introducing some excess mercury metal into the evacuated vessel of the tube, this excess maintaining the pressure constant at any given operating temperature of the tube. Thus the mercury-filled tubes are devoid of gas "clean-up" difficulties so long as ambient temperature changes do not exceed approximately ±20° C. change from room temperature. Since mercury vapor, at the low pressures used in the tubes and at room temperature, is readily condensable, the mercury tubes are very sensitive to ambient temperatures, and when the ambient temperature changes exceed the above-mentioned ±20° C. range in the negative direction, there is a marked condensation of the mercury vapor and the concomitant difficulty in starting the tube and operating it at the rated characteristics. The same difficulty, but in the reverse sense, is encountered when the ambient temperature exceeds 20° C. range in the positive direction, the mercury vapor being so high that the greater degree of ionization of the mercury vapor produces flash-overs and sustained arcs. Thus when large ambient temperature variations, such as those encountered in connection with aircraft or military use, are anticipated, it becomes necessary to substitute some medium for mercury which will be less sensitive to large fluctuations in the ambient temperature. One of the more suitable substances is hydrogen. Hydrogen has a somewhat higher arc voltage drop, but this higher voltage drop becomes a very minor factor if, at the expense of this slightly higher voltage drop one can obtain stable operation of the tube over a much wider ambient temperature range. This is indeed the case when hydrogen is used as the conducting medium. Moreover, hydrogen has an added advantage of having a shorter time of deionization, which is a very desirable feature in many applications of the gas-filled tubes. It has been discovered however, that substitution of hydrogen for mercury may result in the so-called "gas clean-up" phenomenon, the hydrogen in the tube vessel being gradually absorbed by the elements of the tube thereby shortening the useful life of the tube.

This invention discloses the methods of providing hydrogen reservoirs within the structure of the tube so that the hydrogen clean-up phenomenon is eliminated altogether and the useful life of the tube does not depend any longer on the supply of hydrogen. According to the invention various hydrogen-absorbing elements or materials are used in constructing the tube, and these elements or materials are saturated with hydrogen prior to sealing of the glass vessel.

According to another embodiment of the invention the hydrogen reservoir is provided in a form of a capsule containing a hydride of the above elements or materials which can be heated by means of an electric heating coil to that temperature which maintains the desired hydrogen pressure constant.

It is therefore an object of this invention to provide a hydrogen-filled thermionic tube with a reservoir of hydrogen which is capable of replenishing free hydrogen in the tube.

An additional object of this invention is to provide a reservoir of hydrogen for a hydrogen-filled thermionic tube, this reservoir being in a form of a hydride deposited on some of the metallic elements of the tube.

Still another object of this invention is to provide a reservoir of hydrogen for a hydrogen-filled thermionic tube, the reservoir being in a form of a heated capsule.

These and other objects of the invention will be more clearly understood from the following detailed description and the accompanying drawings in which:

Figure 13 illustrates time vs. pressure curves of a megawatt thyratron when it is turned on.

In the introductory part of the specification it has been stated that since mercury vapor is readily condensible at the low pressures and temperatures, the mercury tubes are sensitive to ambient temperatures. The same difficulty may exist when hydrogen is substituted for mercury if the dissociation temperature of the selected hydride is in the region of room temperature or the expected range of the ambient temperatures. The invention avoids this difficulty by selecting hydrides which produce the desired hydrogen pressure within the vessel of the tube at temperatures which are sufficiently removed from the fluctuating ambient temperatures and therefore fluctuations in the ambient temperature do not have any appreciable effect on the hydrogen pressure maintained by the selected hydride. The controlling factors in selecting the hydrides will become more apparent from the discussion that is to follow.

It is known that hydrogen unites physically and chemically with most elements forming "hydrides." The term hydrides, in the broadest sense, includes the chemically combined elements such as $BaH_2$ and indefinite, "physical," metallic hydrides such as $TaH_x$.

Compounds of the non-metals and metalloids, in which hydrogen seems to play the role of a positive univalent element, while the other element behaves as a negative or a non-metallic element, are usually, although not always, more stable than the hydrides of the metals, and therefore represent poor sources of hydrogen for the intended purpose. Since there are available more suitable sources of hydrogen among metallic hydrides, the discussion of the compounds of the non-metals and metalloids will be omitted altogether.

Different products of the action of hydrogen on metals may be arranged in two classes:

1. Compounds of the alkali and alkaline-earth metals. These compounds are crystalline and are stable enough to be volatile without much decomposition in an atmosphere of hydrogen at comparatively low temperatures. They are hydrides proper, being related to the chlorides and nitrides in that the hydrogen plays the role of a non-metallic univalent element. They will be called "chemical" hydrides, since they represent definite chemical compounds.

2. Indefinite metallic "hydrides." These form solid phases whose composition varies with external conditions of temperature and hydrogen pressure, somewhat similar to absorbents of colloids. An example is the zirconium-hydrogen alloy. They will be called "physical" hydrides although some have a definite formula when the maximum hydrogen is combined, and others have an undetermined formula resembling a solid solution of the hydrogen in the metal and sometimes known as "occlusion." Since actual formulas of such previously undetermined compounds are established from time to time, it may be reasonable to assume that the now undetermined formulae will also be established; in any case the compositions are commonly known as "hydrides."

If A. Werner's periodic arrangement of the elements, Table 1, be considered, the metals which form the compounds of the first class, i. e., chemical hydrides, are confined at the extreme left, and are marked off with a heavy line on the left side of the table. The compounds with the non-metals and metalloids are confined to a group on the extreme right, also marked off with a heavy line on the right side of the table, and are not considered here as explained above. The center part of the table between the heavy lines, is occupied by the metals which form the indefinite metallic hydrides which are grouped above in class 2.

The elements which combine as physical hydrides thus form a center group with sub-groups on the left and right. The sub-group on the right represents the previously mentioned non-metals and metalloids which form more stable hydrides than the hydrides of the metals and therefore are less suitable for the intended purpose.

Among the elements combining as physical hydrides, which form the center group in the Werner's table, the following elements form the most suitable hydrides: zirconium; titanium; tantalum; thorium, and uranium. Although numerous other elements from the center group are capable of occluding large amounts of hydrogen, which in some instances exceeds the amount absorbed by the above-mentioned elements (a leading example is palladium), the dissociation temperature of some of these hydrides, at the desired pressure, is so low that they do not represent most suitable sources of hydrogen and for this reason will not be discussed in this specification.

The rare earth metals, although they also form hydrides, are with the exception of cesium, not readily available elements, and for this reason do not represent practical sources of hydrogen for the intended use.

Table 1.—A. Werner's Periodic Table modified to show the relation of the elements to hydrogen

| H | --- | ----- | --- | --- | --- | --- | --- | --- | --- | --- | --- | --- | --- | --- | --- | --- | --- | He |
|---|---|---|---|---|---|---|---|---|---|---|---|---|---|---|---|---|---|---|
| Li | --- | ----- | --- | --- | --- | --- | --- | --- | --- | --- | --- | Be | B | C | N | O | F | Ne |
| Na | --- | ----- | --- | --- | --- | --- | --- | --- | --- | --- | --- | Mg | Al | Si | P | S | Cl | A |
| K | Ca | ----- | Sc | Ti | V | Cr | Mn | Fe | Co | Ni | Cu | Zn | Ga | Ge | As | Se | Br | Kr |
| Rb | Sr | ----- | Y | Zr | Nb | Mo | ------- | Ru | Rh | Pd | Ag | Cd | In | Sn | Sb | Te | I | X |
| Cs | Ba | Rare earth metals | ------- | ------- | Ta | W | ------- | Os | Ir | Pt | Au | Hg | Tl | Pb | Bi | ------- | ------- | ------- |
| -- | Ra | Th U | --- | --- | --- | --- | --- | --- | --- | --- | --- | --- | --- | --- | --- | --- | --- | -- |

In the sub-group on the left side, which includes the previously mentioned compounds of the alkali and alkali-earth metals of the first class, barium, strontium and calcium are the most suitable elements forming that type of hydrides which have the dissociation temperature and pressure equilibriums which are the most suitable to act as the sources of hydrogen, with barium forming one of the more effective hydrides for the intended use among the selected group.

In Table 1 among the physical hydrides, zirconium is one of the more effective absorbers whose dissociation temperature, creating the desired pressure, is sufficiently high to make it, for practical purposes, insensitive to the relatively large fluctuations of the ambient temperature. Because of these physical characteristics of the zirconium hydride, it represents an especially effective reservoir of hydrogen, this reservoir taking the form of a physical hydride in this instance. However, zirconium hydride, as well as numerous other physical hydrides, is brittle, and therefore cannot be used independently for constructing the structural elements of the tube. It may be used nevertheless as a source of hydrogen if it is deposited in the known manner in the form of a very fine metallic powder, metallic layer, or spongy metallic layer, on the surfaces of the structural elements of the tube, and especially on those elements which attain sufficiently high temperature to produce the necessary hydrogen pressure in the vessel of the tube, the temperature of these elements thus being the sole factor controlling the hydrogen pressure in the tube, as long as there is sufficient of amount of hydride material for the volumetric displacement of the vessel of the tube. This is also the case even if there is a gradual absorption and adsorption of hydrogen taking place by any other elements of the tube since any lowering of the pressure is simultaneously compensated by the liberation of additional hydrogen by the metallic hydride according to the well known phase rule.

The same procedure of coating metallic structural elements is also applicable to the hydrides of the first class.

Thus, in this form of the invention, the structural elements of the tube, when heated to their operating temperatures, furnish the necessary source of heat for heating the selected hydride to that dissociation temperature which creates the desired hydrogen pressure within the vessel of the tube according to the phase rule, and this pressure remains constant as long as the temperature of the hydride remains constant.

According to another embodiment of the invention, the hydrides, either of a first or second class, are inserted in the capsule provided with a separate heater coil, and the temperature of the capsule is raised to the temperature producing the necessary hydrogen pressure within the tube.

The invention will be first described by the way of an example in connection with a one megawatt thyratron and the selected hydride will be zirconium hydride of the second class.

Figure 1:
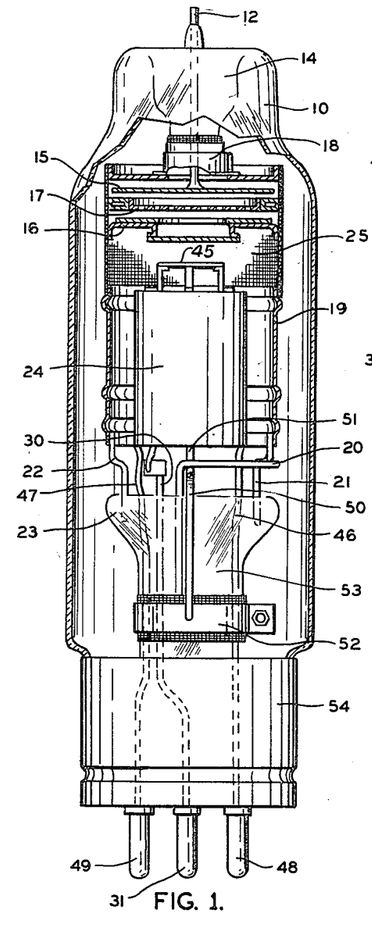
Figure 1 is an elevational view of a hydrogen-filled thermionic tube, or thyratron.
Figure 2:
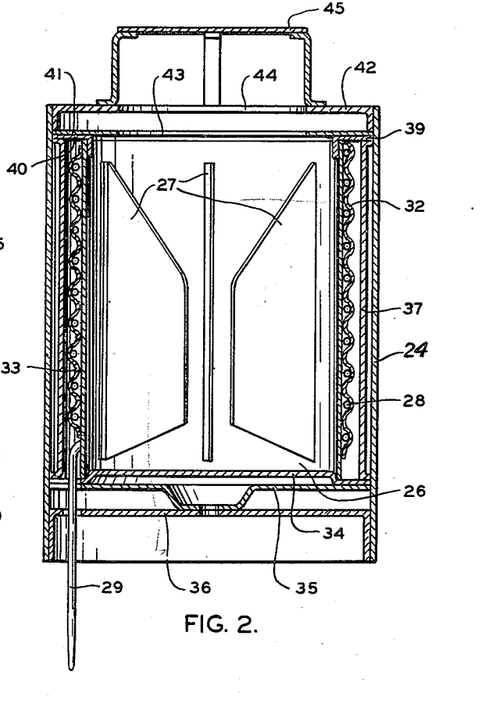
Figure 2 is the enlarged cross-sectional view of the cathode of the thyratron illustrated in Fig. 1.

Referring to Fig. 1, a glass vessel 10 is constructed in well-known manner with an anode lead 12 emerging from the vessel through an upper glass seal 14, this seal holding an anode 15 in spaced relationship with respect to grid elements 16 and 17. The grid element including mesh sleeve 25 is fastened with its upper portion to the upper glass seal by means of a collar 18, the lower portion of the grid being connected to a cylinder 19 which acts as a support for the grid as well as a conducting element for connecting the grid to a lead-in wire 20. Cylinder 19 is supported by wires 21 and 22 embedded in a glass press 23. Cylinder 19 also acts as a heat shielding element for the cathode of the thyratron. Only an external heat shield 24 and a baffle 45 of the cathode are visible in Fig. 1, the enlarged cross-sectional view of the cathode being illustrated more fully in Fig. 2. It consists of a cathode cylinder 26 provided with a plurality of vanes 27 which increase the emissive surface of the cathode. The inner surface of cylinder 26 and all surfaces of the vanes 27 are coated with an electron emitting mixture of barium and strontium oxide. The cathode cylinder 26 is surrounded by a heater coil 28 which is coated with a refractory, insulating material such as aluminum oxide for insulating the coil from the cathode. The coil is connected by means of a conductor 29 and a lead-in wire 30 to a prong 31, the opposite end of the coil being spot-welded to the upper rim of the cathode cylinder 26. The cathode cylinder rests on a "hat" 34 which in turn is supported by an intermediate baffle 35 and the baffle itself is supported by a cathode base 36; the hat, the intermediate baffle, and the cathode base all have an opening for wire 29 as illustrated in the figure, these openings permitting the connection between the coil and the lead-in wire 30. Besides acting as a supporting means for the cathode, the hat, the intermediate baffle, and the base, act as heat shields for the heater coil and the cathode. In the vertical plane, the heater coil and the cathode are provided with an internal heat shield 37 and an external heat shield 24, these two shields representing two metallic cylinders. Base 36 is spot-welded to the external heat shield 24, the intermediate baffle is spot-welded to the cathode base 36, and hat 34 is spot-welded to the intermediate baffle 35. The upper portion of the cathode cylinder 36 is provided with straps 39 and 40 which are spot-welded to the external heat shield 24. The upper structure of the cathode is provided with a heat-shielding ring 41 and a baffle ring 42, the two being spot-welded together to each other and to the external heat shield 24. Rings 41 and 42 are provided with central openings 43 and 44 which allow the electrons to follow their path from cathode 26 to anode 15. An additional baffle 45 is provided in concentric relationship and directly above the openings 43 and 44 which acts as a heat shield as well as a baffle preventing the deposition of the electron emitting barium and strontium oxides on the grid and anode elements of the tube. The external heat shield 24 is supported by the lead-in wires 46 and 47 which are connected to prongs 48 and 49, these prongs being the two grounded prongs of the thyratron. In addition to the lead-in wires 46 and 47, the external heat shield 24, as well as the entire cathode structure illustrated in Figure 2, is supported by metallic rods 50 and 51 which are spot-welded to a strap 52 fastened to the upper portion of a glass stem 53. The glass vessel 10 is cemented to a base 54 in the regular manner. The operating elements of the tube including the cathode structure illustrated in Fig. 2, the grid elements 16—18, shield 19, and anode 15, are preferably made of the so-called "pure" nickel in which chemically pure nickel comprises approximately 99% and the remaining 1% should be relatively free of such impurities as copper, iron, manganese, magnesium and carbon which are to a considerable extent responsible for the hydrogen clean-up phenomenon.

Obtaining of nickel which is free of hydrogen absorption is often difficult and introducing of the hydrogen reservoir into the vessel simplifies this problem to a very large extent since, as mentioned previously, even if there is any absorption of hydrogen it is compensated for by the hydride. Thus with the hydrogen reservoir available within the vessel it is also possible to use nickel which has a lower degree of purity.

Figure 5:
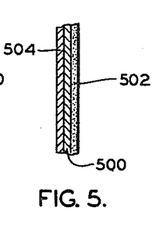

The operating elements of the tube, such as cathode structure illustrated in Fig. 2, the grid elements 16—18, shield 19, and anode 15, all have different operating temperatures, and since it is the temperature that controls the amount of liberated hydrogen, and thus the pressure of the liberated hydrogen, the deposition of zirconium on any specific element or elements of the tube is controlled by the operating temperatures of that particular element or elements. Since the operating temperatures of the elements vary in different structures and types of tubes, no universal rule can be stated as to which particular element should be coated with zirconium. It is obvious that cathode cylinder 26 is always the hottest element in the tube, and when the highest degree of dissociation is desired for any particular tube, and the temperature of the cathode, such as cylinder 26, in Fig. 2, does not exceed the desired dissociation temperature, the cathode is the proper element to use for depositing zirconium. In Fig. 2, the deposition of zirconium would be on the outer surface of cylinder 26 since its inner surface and vanes 27 are used for depositing barium and strontium oxides. Thus the electron-emitting oxides are deposited on the inner walls of the cylinder while zirconium is deposited on the outer wall, as illustrated in Fig. 5. Fig. 5 shows a portion of an enlarged cross-sectional view of the wall of cylinder 26 constructed according to this method. The center element 500, which corresponds to cylinder 26, is made of nickel, the inner layer 502, deposited on the nickel structure 500, represents an electron-emitting mixture of barium and strontium oxides, and layer 504, deposited on the outer surface of the nickel cylinder 500, represents a layer of metallic zirconium hydride which adheres to nickel wall 500. It is zirconium hydride 504 that acts as a reservoir of hydrogen in the illustrated structure.

Figure 4:
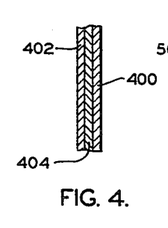
Figures 4 and 5 are the enlarged cross-sectional views of the structural elements of the tube illustrated in Fig. 1.

In many instances the temperature of the cathode cylinder is too high for producing the desired equilibrium pressure required for good tube performance and when this is the case it becomes necessary to deposit zirconium prior to its hydrogenation on some other elements of the tube whose operating temperatures are lower than the temperature of the cathode cylinder. These elements may be the internal heat shields 37, 34 and 43, the external heat shields 24, 42, 45, 35 and 36, and finally such elements as anode 15, grid elements 16, 17, 18 and 25, and grid shield 19, these elements being named in the order of the decreasing operating temperatures. When any of these elements are used for retaining zirconium hydride, both surfaces of the element may be used for such purpose. This is illustrated in Fig. 4 where the layers of zirconium 400 and 402 are applied to a nickel wall 404, wall 404 being, in this case, the wall of any one of the above-mentioned elements.

Since dissociation of hydrogen follows the phase rule, the dissociation process in the majority of physical hydrides is a reversible phenomenon with the result that when the operation of the tube is discontinued and the tube cools itself off to ambient temperature, the liberated hydrogen is absorbed again by the metal. When the tube is operated at the extremely low ambient temperatures, the initial hydrogen pressure, prior to turning on the tube, may be anywhere between zero and slightly above zero, but lower than the required hydrogen pressure for normal operation of the tube. Therefore, it becomes necessary to restore the hydrogen pressure before the tube may be operated as a gas-filled thermionic tube, and this restoration of the hydrogen pressure is accomplished simultaneously with the bringing up of the cathode temperature to the electron-emitting temperature, hydrogen gas being liberated by a hydride simultaneously with the heating cycle of the cathode cylinder 26.

It is to be noted that the equilibrium pressure of hydrogen liberated by the hydrides is a function of the temperature only (it is assumed that there is an excess of hydride present within the tube's vessel, which is always the case), and therefore, generally speaking, it is most advantageous to have deposits of hydride on those surfaces of the tube which are heated to the highest temperature at the very beginning of the operation of the tube, i. e., the cathode structure disclosed in Fig. 2, as long as the element of the structure does not normally rise above the desired temperature required for attaining the optimum pressure. When cathode elements are used for heating the hydride, the gas-pressure inertia of the tube is at a minimum, and the hydrogen pressure may be restored during the initial operating cycle of the tube in the shortest possible time. When the hydride is deposited on the metallic parts which are removed from the source of heat, establishment of the necessary hydrogen pressure during the initial operating stages of the tube consumes a longer period of time because of the progressively increasing calorific inertia of these parts.

In order to saturate the structural elements of the tube as well as to hydrogenize the metallic zirconium, the following procedure is used:

1. Pump to good vacuum ($10^{-6}$ mm. Hg).

2. Bake at 450° C. for ½ hour with the vessel connected to the pump. After this operation barium and strontium carbonates deposited on the inner surface of the cathode cylinder 26 and the vanes are converted to the oxides, by heating the cathode to 1000° C. slowly by means of heating coil 28.

3. All metal parts are heated by induction to a temperature of approximately 900° C. The cathode 26 is heated to a temperature of approximately 1000° C. by connecting the heater coil 28 to a source of power. Liquid air is applied to the trap of the vacuum pump for condensing any mercury vapor. This operation is continued for approximately ten minutes.

4. The glass vessel 10 is then filled with hydrogen gas to a pressure in the order of 80 cms. and the metal parts are inductively heated to 1000° C. whereupon they are allowed to cool. The nickel parts of the tube absorb hydrogen during the cooling process, and this absorption of hydrogen results in the lowering of the pressure of hydrogen within the vessel. The hydrogen pressure is not allowed to drop below 600 microns.

5. With the hydrogen pressure maintained at 600 microns, the tube is operated with an alternating current source 300, Fig. 3, connected between the cathode and the anode, with the grid of the tube connected to the anode, resistances 302 and 304 being inserted in the grid and plate circuits of the thyratron. These resistances, as well as the potential of source 300, are adjusted so that meter 306 gives an indication of three amperes space current from both the grid and the anode. With the tube operated in this manner and the vessel of the tube connected to a source of hydrogen 308, Fig. 3, the hydrogen pressure is maintained constant until no further hydrogen is absorbed or released by the elements of the tube.

6. The vessel is then sealed-off at 600 microns hydrogen pressure while the tube is operated.

With the above-mentioned procedure applied to the megawatt thyratron, sufficient hydrogen will be absorbed by the deposited zirconium layers of the thyratron so as to maintain the hydrogen pressure constant during the normal operating conditions of the tube, the ambient temperature within the glass vessel and the temperature of the metal parts being the factors determining the ambient pressure of the free hydrogen within the vessel. It is to be noted that the hydrogen pressure, because of the continued absorption of hydrogen by the deposited layers of zirconium, will be lower than 600 microns when the tube is cold, the pressure dropping to a few microns at room temperature. When the tube is turned on and heater coil 28 heats the cathode and the adjacent shields, there is a sufficient liberation of hydrogen from the heated parts of the cathode and the shields for restoring the hydrogen pressure to normal with the result that the tube starts operating in the normal manner.

The mechanism of the hydrogen-filled thyratron provided with the deposited layers of hydride, which acts as a reservoir of hydrogen, is therefore as follows:

The elements of the tube are constructed of any suitable metal, preferably nickel. The nickel surface or surfaces which are known to reach the desired temperatures during the normal operating cycle of the tube are then coated with the physical or chemical hydride whereupon the tube is subjected to the de-gassing and hydrogenation procedure outlined above. In this case zirconium hydride acts as a hydrogen reservoir and nickel acts, in the main, as the structural and current carrying elements of the tube, the use of nickel for the structural elements rather than of zirconium being preferable because of the brittleness of the zirconium hydride.

The invention thus far has been described specifically in connection with zirconium hydride, however, additional metallic hydrides of the second class and alkali or alkaline earth hydrides of the first class are also suitable for this purpose and therefore, as mentioned previously, the structural elements of the tube may be also coated with the hydrides of barium, strontium, calcium, which form chemical hydrides of the first class and titanium, thorium, uranium and tantalum, which form physical hydrides of the second class.

It should be also stated here that the invention is not limited to the use of any particular element alone as a source of hydrogen, since it is apparent from the given description that the mixtures and alloys of these elements may be also used for accomplishing the sought result.

In determining the type of hydride to be used, the main factors determining the choice of reservoir element or material are:

1. Characteristics of the desired tube. The required optimum hydrogen pressure within the tubes are controlled by the rated capacities and the geometry of the elements but only certain hydrides, chemical or physical, could be used to give that optimum hydrogen pressure, which is dependent on the hydride's equilibrium decomposition pressure, which in itself is dependent on temperature. In other words, the characteristics of the desired tube determine what hydrides can be used because the various hydrides have different equilibrium dissociation pressures at a given temperature.

2. Ease and rate of approaching the ultimate equilibrium pressure required for good tube performance, this factor, as stated before also including the temperature range; the required temperature for producing the optimum pressure should be sufficiently removed from the ambient temperature variations so that the ambient temperature variations may not produce a marked effect on the pressure, 3. Physical or chemical stability of hydride, which determine such factors as ease of manufacture, use, reliability, etc.

In Figs. 1 through 5 one or several of the operating elements of the tube are used as heating elements for the hydrides. Since the equilibrium decomposition pressure of the hydrides is dependent on temperature, it follows that the heating element must possess proper temperature for obtaining optimum hydrogen pressure, and this temperature must remain, during the operating cycle of the tube, substantially constant for maintaining the hydrogen pressure constant. These conditions are attainable in the majority of the cases, since it is quite as important to keep the temperature of the electron-emissive surface of the cathode constant in all thermionic tubes for maintaining constant their operating characteristics. Nevertheless, when the load conditions and the geometry of the tube are apt to produce temperature fluctuations which cannot be neglected and there is a concomitant variation in the pressure of hydrogen, the hydrogen supply problem may be solved in the manner illustrated in Figs. 6 through 9.

Figure 6:
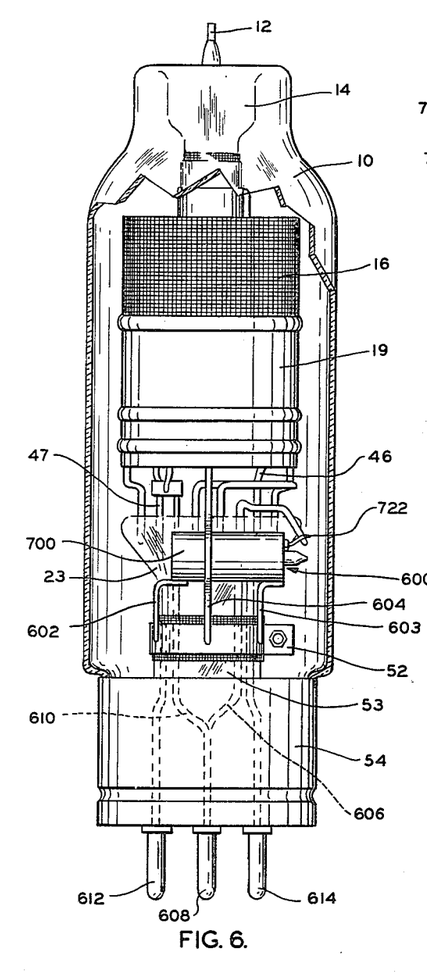
Figure 6 is an elevational view of a thyratron with a hydride capsule.
Figure 7:
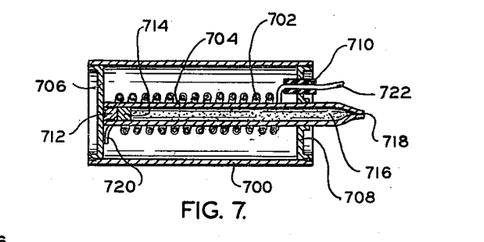
Figure 7 is a cross-sectional view of the capsule.
Figure 8:
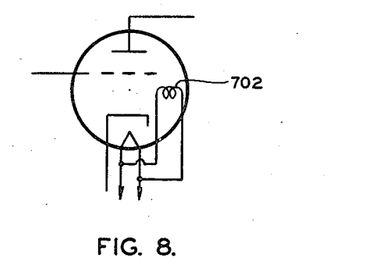
Figures 8 and 9 are alternative circuits for the heater of the capsule illustrated in Fig. 7, Figures 10, 11, 12, 14, and 15, illustrate the dissociation curves of various hydrides.

In Figs. 6 through 9 the heating element for the hydride is an independent heating element whose cross-sectional view is illustrated in Fig. 7. The entire assembly illustrated in Fig. 7 will be called a hydride capsule.

Referring to Fig. 7, the capsule consists of a cylindrical heat shield 700, an aluminum oxide-coated heater coil 702 mounted on a hydride container 704 coaxially positioned within the heater shield 700, two end-baffles 706 and 708, an insulating bushing 710, and nickel plugs 712 and 714. The heater is assembled as follows: The hydride container 704, which is a nickel tube approximately ⅛ inch in diameter, is filled with hydride 716, with plug 714 inserted into the tube, this plug acting as a means for plugging up one end of the tube. After filling the tube with the hydride the right end, which is end 718, of the tube is squeezed together, as illustrated in the drawing, so that the hydride cannot fall out of the tube during its subsequent manipulation. A nickel plug 712 is spot-welded to baffle 706 whereupon nickel tube 704 is slipped with its left end over plug 712 and pushed up snugly against baffle 706 whereupon tube 704 is cross-welded to plug 712. The squeezed and plugged ends of tube 704 are not welded; since hydrogen penetrates very minute openings the various joints provide adequate connecting channels from the hydride container to the remainder of the gas-filled tube. The heater coil 702 is then slipped over tube 704 and the left end of the coil is welded at 720 to baffle 706, the welded end of the coil being grounded. The other end of the coil, which is end 722, is slipped through an opening in bushing 710 which insulates the heater coil from baffle 708. To accomplish this, baffle 708 is inserted in shield 700, and shield 700 is then slipped over the flanges of baffle 706 whereupon the flanges of the baffle and the shield are welded together as illustrated in the figure.

Figure 9:
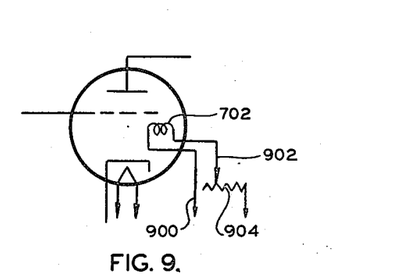

The capsule is now ready for its mounting in the thyratron, its position in the thyratron being illustrated in Fig. 6. As in the case of Fig. 1, the thyratron includes a glass vessel 10, an anode lead-in conductor 12, an anode supporting glass stem 14, a grid element 16, a grid supporting outer cylinder 19, and a plurality of supporting rods and lead-in conductors embedded in a press 23 of the lower glass-seal cylinder 53 of the tube. The glass vessel, as usual, is mounted on a base 54. The glass stem 53 is provided with a metallic strap 52 and the hydride capsule 700 is mounted directly above strap 53 which supports it by means of rods 602, 603 and 604, the rods 602 and 603 being welded to strap 53 with their lower ends and to the lower portion of cylinder 700 with their upper ends. The outer ungrounded conductor 722 of the heater is connected by means of a lead-in conductor 606 to a prong 608, this prong being also connected through a lead-in wire 610 to the heater coil of the cathode. The heater coil is not illustrated in Fig. 6 but it is identical in all respects to coil 28 illustrated in Fig. 2. Thus the heater coil 702 of the capsule is connected directly across the heater coil of the cathode, prongs 612 and 614 being the two grounded prongs of the thyratron. The circuit of the heater coil of the capsule in Fig. 6 is therefore as follows: a source of potential connected to prong 608, conductor 606, lead-in wire 722, coil 702, baffle 706, shield 700, rods 602 and 603, strap 52, rod 604, cylindrical shield 19, grounded rods 46 and 47, and grounded prongs 612 and 614. This connection is illustrated more clearly in Fig. 8; a more versatile connection is illustrated in Fig. 9. The resistance of the heater coil 702 is adjusted to heat up the hydride to that temperature which will maintain proper hydrogen pressure in the thyratron, this hydrogen being liberated by the heated hydride 716 inserted in tube 704. In Fig. 9 the lead-in wires 900 and 902 of heater coil 702 are brought out to independent prongs, and the resistance of the heater coil may be controlled externally by means of a rheostat 904. Thus in Fig. 9 the hydrogen pressure may be controlled at will by rheostat 904. As an example, when barium hydride or zirconium hydride is used, the following dissociation takes place:

$$BaH_2 + heat \longrightarrow Ba + H_2$$

$$Zr \cdot H_x + heat \longrightarrow Z + \frac{x}{2}H_2$$

The reaction is a reversible one so that upon cooling there is a reabsorption of hydrogen by barium or zirconium. The physical state of the barium or zirconium metal of course determines the rate of reabsorption. Barium hydride is a good source of hydrogen as it may be seen from the dissociation curves illustrated in Figures 10, 11, 12 and 13. However it is unstable in air since it absorbs and reacts with moisture and thereby decomposes according to the following reaction:

$$BaH_2 + H_2O \rightarrow BaO + 2H_2$$

Figure 14:
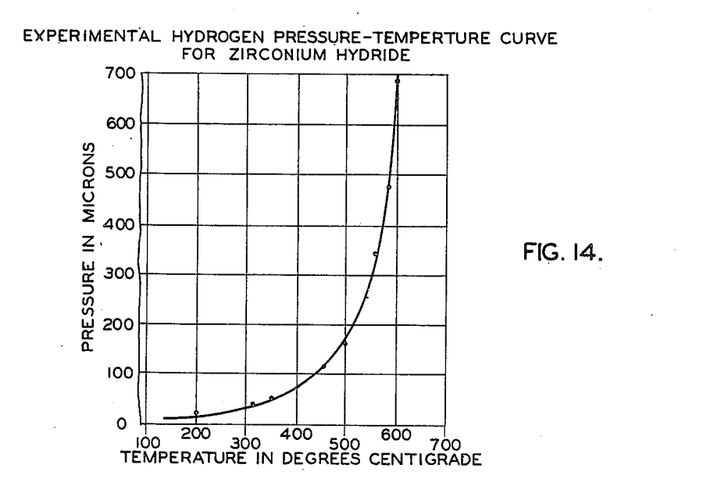

Accordingly it may be used only if proper precautions are taken in its handling prior to its insertion into the vessel of the tube. Zirconium hydride does not suffer from this disadvantage and therefore its handling prior to its insertion into the tube is easier than that of barium hydride, the dissociation curve of zirconium hydride is illustrated in Fig. 14.

Figures 10, 11:
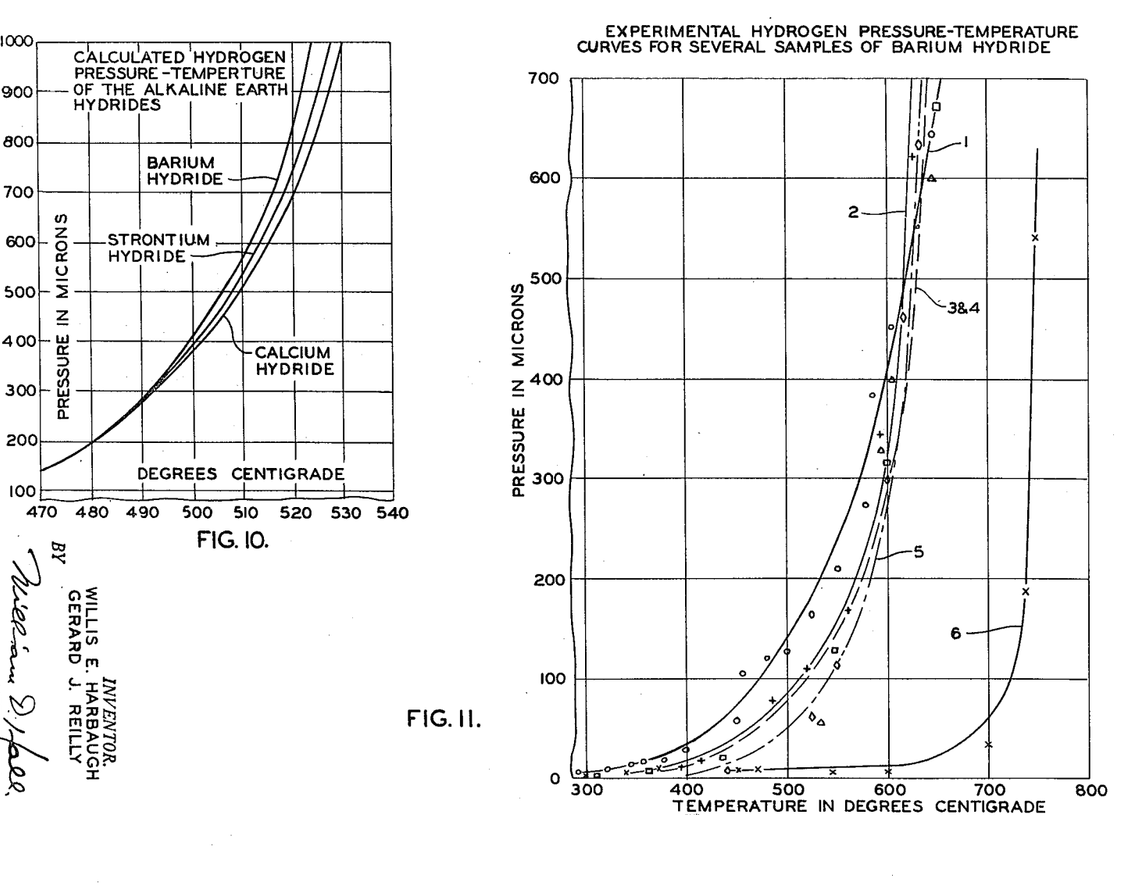

Fig. 10 illustrates theoretically computed dissociation curves for barium, strontium, and calcium hydrides. The calculations were based on thermodynamic free-energy and heat-content values given in the literature.

Fig. 11 illustrates a family of the dissociation curves for barium hydride which were obtained in the following manner:

Curve #1 was obtained by setting a thermocouple into barium hydride sample which itself was inserted in a tube similar to tube 704 illustrated in Fig. 7. The tube was then inserted in a glass vessel and the vessel pumped out. It was then heated for ½ hour at 450° C. with the vessel connected to the pump. The temperature of the glass vessel was then raised to 600° C. and filled with hydrogen to a pressure of 5 mm. and this pressure was maintained within the vessel for ½ hour. Next, with the temperature lowered to 300° C., the vessel was pumped out to hard vacuum, the pumping schedule being continued for ½ hour. The vessel was then sealed-off, allowed to cool and temperature vs. pressure curve #1 obtained by gradually raising the temperature of the glass vessel and of the barium hydride capsule contained in the vessel. The temperature of barium hydride within the capsule was measured by means of the previously mentioned thermocouple inserted in barium hydride, and it was this temperature that was used for plotting the curve.

Curves 2, 3, 4 and 5 were obtained by following the schedules which were as follows:

*Curve #2*

1. Pumping for ½ hour at 450° C.
2. Temperature raised to 600° C., hydrogen pressure maintained at 1 centimeter and the pumping continued for ½ hour.
3. Temperature lowered to 300° C. and the pumping continued for ½ hour.
4. The vessel was then sealed-off and the dissociation-curve run made.

*Curve #3*

1. Temperature raised to 450° C., and pumping continued for ½ hour.
2. Temperature raised to 600° C., hydrogen pressure maintained at 1 centimeter for ½ hour.
3. Temperature lowered to 300° C. (the source of hydrogen gases connected) and the vessel pumped to hard vacuum for ½ hour.
4. Dissociation curve run made.

*Curve #4*

Same as curve #3 above.

*Curve #5*

1. Temperature raised to 450° C. and the vessel pumped to hard vacuum for ½ hour.
2. Temperature raised to 600° C. hydrogen pressure maintained at 1 centimeter for ½ hour.
3. The hydrogen source disconnected, the vessel temperature raised to 450° C. and pumped to hard vacuum for ½ hour.
4. The dissociation curve run made.

*Curve #6*

1. Temperature raised to 450° C. and the vessel pumped to hard vacuum over a period of ½ hour.

2. The dissociation curve run was made.

Comparison of the curves 1 through 5 with that of curve 6 indicates clearly that there is some association or absorption of hydrogen by the samples of barium used in the dissociation curve runs which obviously indicates that hydrogen treatment of the barium hydride is desirable if one wishes to obtain the desired gas pressures in a thyratron at lower temperatures. Since the desired working hydrogen pressure in the thyratron under consideration is in the order of 600 microns the curves illustrated in Fig. 11 indicate that the temperature of the hydrides should be in the order of 630° C.

The theoretical curves illustrated in Fig. 10 do not agree with the curves in Fig. 11 which is probably due to the fact that there may be differences in the techniques and apparatuses used; remoteness from equilibria may exist which may depend on the physical state of the material as well as on the design of the apparatus; and other unpredictable surface phenomena may enter to cause discrepancies.

Figure 12:
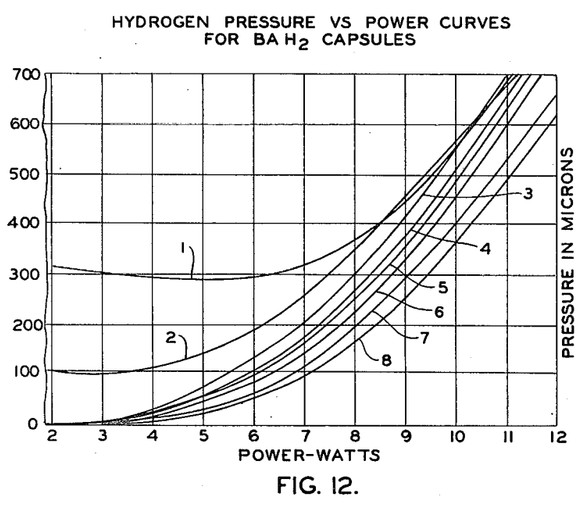

Fig. 12 illustrates a family of curves which were obtained by inserting the capsule similar to that illustrated in Fig. 7 filled with different samples of barium hydride, and measuring the power input dissipated in the heater coil such as heater coil 702, Fig. 7. The hydrogen pressure runs were obtained by first evacuating the vessel to hard vacuum and baking the apparatus at 450° C. while continuing with the pumping schedule for ½ hour; the temperature was then raised to 600° C. and the pumping schedule continued for ½ hour while the vessel was filled with hydrogen and the hydrogen pressure maintained at 5 millimeters throughout the run; the hydrogen source was then disconnected and the pumping schedule continued for an additional ½ hour with the temperature remaining at 450° C. whereupon the glass vessel was sealed-off and the pressure vs. power curves obtained. The curves of Fig. 12 illustrate that a power input in the order of 10 to 12 watts is required for maintaining the desired hydrogen pressure in the vessel of the megawatt thyratron.

The following de-gassing and hydrogenation schedule gives good results when applied to the megawatt thyratron tubes of the type illustrated in Fig. 6, i. e., which use the capsule as a source of hydrogen:

1. Glass vessel is pumped out to hard vacuum.
2. Baking is continued for ½ hour at 450° C. with the vessel connected to the pump.
3. With the vessel filled with hydrogen to a pressure of 2 mm., the metal parts of the tube which are above the press 23, Fig. 6, are heated by induction method to 800° C., and this temperature maintained for two minutes with the vessel connected to the pumps. The capsule remains relatively cool because it is below the effective heating field of the induction coil.

Cathode is converted by heat from heater coil 28. Cathode carbonates of barium and strontium are converted into barium and strontium oxides by heat from coil 28.

4. The metal parts of the tube then are degassed by raising the temperature of the parts which are above the glass press 23, Fig. 6, to 900° C. maintaining this temperature for 10 minutes while the glass vessel is connected to the vacuum pumps. Cathode is maintained at 1000° C. by means of additional heat from its heater coil 28. During this operation the capsule remains relatively cool since the induction method is used for heating the upper metal parts of the tube which does not reach the capsule.

5a. The metal parts of the tube above the glass press 23 are inductively heated to 800° C. while the cathode is heated to 900° C. by connecting its heater coil to a source of power and the heating process is continued for two minutes in an atmosphere of hydrogen whose pressure is maintained at 2 mm. while the vessel is connected to the vacuum pumps.

b. Same as 5a but with the source of the external free hydrogen disconnected and tube pumped to a hard vacuum.

c. Same as 5a.

d. Same as 5b.

6. The vessel is then filled with hydrogen to a pressure of 600 microns while the tube is still hot and the heat is then shut off.

Figure 3:
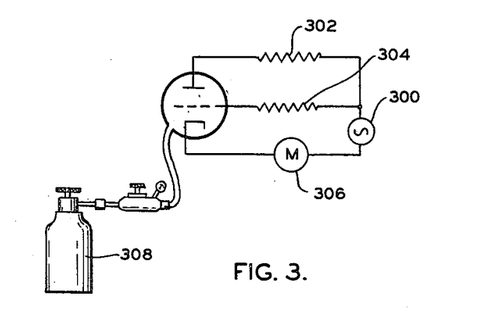
Figure 3 is an explanatory figure.

7. The tube is then operated from an alternating current source with the combined grid plate current equal to approximately 3 amperes and such operation continued for 20 minutes. The schematic diagram of such operation of the tube is illustrated in Fig. 3.

8. The tube is then pumped out to hard vacuum, the pumps are disconnected, and the heater of the capsule is then connected to the rated source of voltage which produces, because of the hydrogen liberated by the hydride, a hydrogen pressure of 600 microns.

9. The tube is then again operated from an A. C. source as in 7.

10. The tube is then allowed to cool and the hydrogen pressure within the vessel, because of its reabsorption, goes to zero.

11a. The vessel is filled with hydrogen up to 600 microns and sealed-off.

b. The vessel is then sealed-off under vacuum.

The alternative procedures suggested in 11a and 11b produce the following results: When free hydrogen up to the pressure of 600 microns is introduced into the tube prior to its sealing, the time lag experienced during the starting of the tube is somewhat shorter than in the case when the tube is sealed-off in a vacuum. This time lag is due to the calorific inertia of the capsule.

Figure 13:
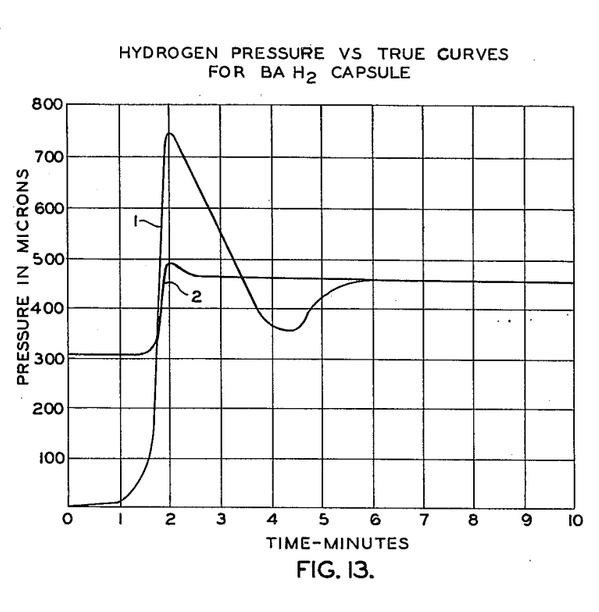

This phenomenon is illustrated in Fig. 13 in which hydrogen pressure vs. time curves #1 and #2 are illustrated for the megawatt thyratron with barium hydride in the capsule, 11 watts dissipated in the heater coil 702, and tube turned on when cool (room temperature). Both curves illustrate the rise of hydrogen pressure in the vessel of the thyratron when the tube was turned on with the initial temperature of the tube equal to room temperature. Curve #1 is for a thyratron sealed-off under vacuum. A maximum pressure of approximately 750 microns was obtained after 2 minutes operation of the heater in the capsule because with the thyratron sealed under vacuum, as stated in 11b, initially there is no hydrogen gas present within the vessel, and, therefore, initially there is no cooling of the capsule by convection, the heat losses being restricted mainly to the heat losses by radiation. The temperature of the capsule thus rises initially to the temperature which is higher than normal operating temperature with the concomitant liberation of excess hydrogen. This higher pressure of hydrogen causes the capsule to be cooled by convection and the hydrogen pressure drops below the normal level. The calorific oscillatory cycle ceases after 6 minutes, and the hydrogen pressure reaches an equilibrium stage.

Curve #2 is a similar curve for the thyratron which was sealed-off with 600 microns hydrogen pressure exerted by the free hydrogen, as described in 11a.

Comparison of the two curves demonstrates the fact that it is preferable to seal the vessel with the free hydrogen introduced into the vessel since it has a smaller initial calorific inertia than the thyratron sealed at vacuum.

Figure 15:
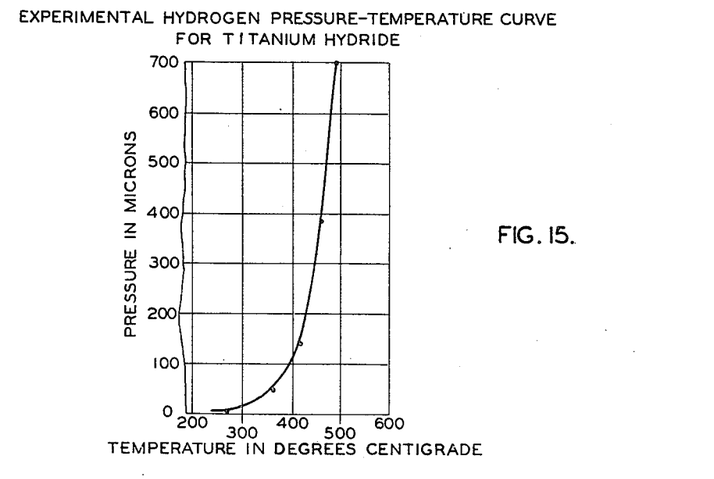

Figs. 14 and 15 disclose typical experimental hydrogen temperature curves for zirconium and titanium hydrides. A chemically pure powdered zirconium (Foot Mineral Company) was used for obtaining zirconium curve illustrated in Fig 14. The experimental procedure for obtaining this curve was as follows:

1. The vessel of the tube was pumped out with a freeze trap in the line and then out-gassed at 1000° C. for ½ hour,
2. It was then cooled and filled with hydrogen to a pressure of one centimeter,
3. The vessel was then heated to 1000° C., held at 1000° C. for 15 minutes, allowed to cool to room temperature and then pumped out,
4. Dissociation determinations were made thereafter.

In the case of titanium, a titanium hydride ($TiH_2$ made by Metal Hydrides Corporation) was used as a source of hydrogen. The experimental curves were obtained by using the following procedure:

1. The vessel was pumped out and a liquid air trap used for freezing out any vapor,
2. The vessel was heated to 450° C. and pumped out to a pressure of approximately 3 microns,
3. Experimental hydrogen pressure temperature determinations were obtained.

Similar curves were also obtained for other hydrides discussed in the specification and they are not furnished to avoid undue burdening of the disclosure. These curves were used for determining the best utilization of the hydrides as a hydrogen reservoir for the thyratrons. From known temperatures of the elements of the contemplated tube (determined in an experimental tube) and the desired pressure within the vessel of the tube for normal operating conditions, these curves at once furnish the information for depositing the hydrides on that element of the tube which gives the necessary hydrogen pressure within the vessel. In the case of the capsules, a curve similar to those illustrated in Fig. 12 is used for determining the wattage that must be used for maintaining the desired hydrogen pressure within the tube. The amount of hydride to be used is computed from the quantity of gas required to give the desired pressure within the envelope of the tube at the required dissociation temperature. Ordinarily larger amounts of hydride than the calculated amount is used in order to insure an excess of hydride within the vessel. This excess insures the fact that constant hydrogen pressure is maintained within the vessel as long as the temperature of hydride remains constant.

From the examination of the hydride curves one can readily see that the selected hydrides (including those whose dissociation curves have not been included among the figures) furnish the desired hydrogen pressure when they are heated to the range of temperatures which is in the order of from 400° C. to 600° C. which is a temperature range removed sufficiently from any ambient temperatures so as to separate sufficiently the effect of artificial heating of the hydrides from the fluctuations of the ambient temperatures. It is to be noted that the ambient temperatures may have some minor effect on the thyratrons of this type but these effects now have been minimized to such an extent that they do not represent a source of practical difficulties for preventing operation of the thyratrons at their optimum operating conditions. When the source of hydrogen is the heated capsule and the circuit of the heated capsule is of the type illustrated in Fig. 9, any adverse effect of the ambient temperatures, which is exhibited in varying heat losses, may be very readily compensated for by adjusting rheostat 904. Thus the hydrogen pressure may be maintained constant irrespective of the ambient temperature by adjusting the power dissipated in the capsule.

While the invention has been described with reference to several particular embodiments, it will be understood that various modifications of the apparatus shown may be made within the scope of the following claims.

We claim:

1. A hydrogen filled thermionic tube having a reservoir of zirconium hydride, and means for heating said reservoir for maintaining hydrogen pressure within said tube.

2. A hydrogen filled thermionic tube having a reservoir of solid titanium hydride, and means for heating said reservoir for maintaining hydrogen pressure within said tube.

3. A hydrogen filled thermionic tube including a gas-tight vessel, a hydride reservoir within said vessel, said reservoir including means for holding said hydride, and heating means surrounding said first means for heating said first means during the operation of said tube.

4. A hydrogen filled thermionic tube having a cathode, a grid, and an anode mounted in a gas-tight vessel, a hydride reservoir mounted within said vessel, and a heater coil for heating said reservoir.

5. A hydrogen filled thermionic tube as defined in claim 4 which further includes a cathode heater coil connected in parallel with said heater coil of said reservoir.

6. A hydrogen filled thermionic tube including a gas-tight vessel, a capsule mounted within said vessel, said capsule including a metallic tube, a hydride within said metallic tube, a heater coil surrounding said metallic tube, a heater shield surrounding said coil, and means for connecting said coil to a source of power for heating said hydride through said metallic tube whereby said hydride acts as a reservoir of hydrogen for said thermionic tube.

7. A hydrogen filled thermionic tube as defined in claim 6 in which said hydride is a metallic hydride.

8. A hydrogen filled thermionic tube as defined in claim 6 in which said capsule is mounted at the base of said vessel so as to avoid excessive heating of said capsule during the degassing process of said tube.

9. A hydrogen filled thermionic tube having a reservoir of a solid chemical hydride of a metal of the group consisting of titanium and zirconium, and means for heating said reservoir for maintaining hydrogen pressure within said tube.

GERARD J. REILLY.
WILLIS E. HARBAUGH.

(References on following page)

REFERENCES CITED

The following references are of record in the file of this patent:

UNITED STATES PATENTS

| Number | Name | Date |
|---|---|---|
| 1,861,643 | Pirani | June 7, 1932 |
| 2,399,003 | Grapuchettes | Apr. 23, 1946 |

FOREIGN PATENTS

| Number | Country | Date |
|---|---|---|
| 413,076 | Great Britain | July 12, 1934 |

OTHER REFERENCES

Chemistry of the Less Familiar Elements, vol. 1, chapter 11, p. 7, by B. S. Hopkins, copyright 1932, published by Stripes Publishing Co., Champaign, Ill.